June 12, 1956  H. E. BALSIGER  2,749,673
GRINDING MACHINE SET-UP MEANS
Filed Feb. 19, 1953  2 Sheets-Sheet 1

INVENTOR
HAROLD E. BALSIGER
BY
ATTORNEY

June 12, 1956 H. E. BALSIGER 2,749,673
GRINDING MACHINE SET-UP MEANS
Filed Feb. 19, 1953 2 Sheets-Sheet 2
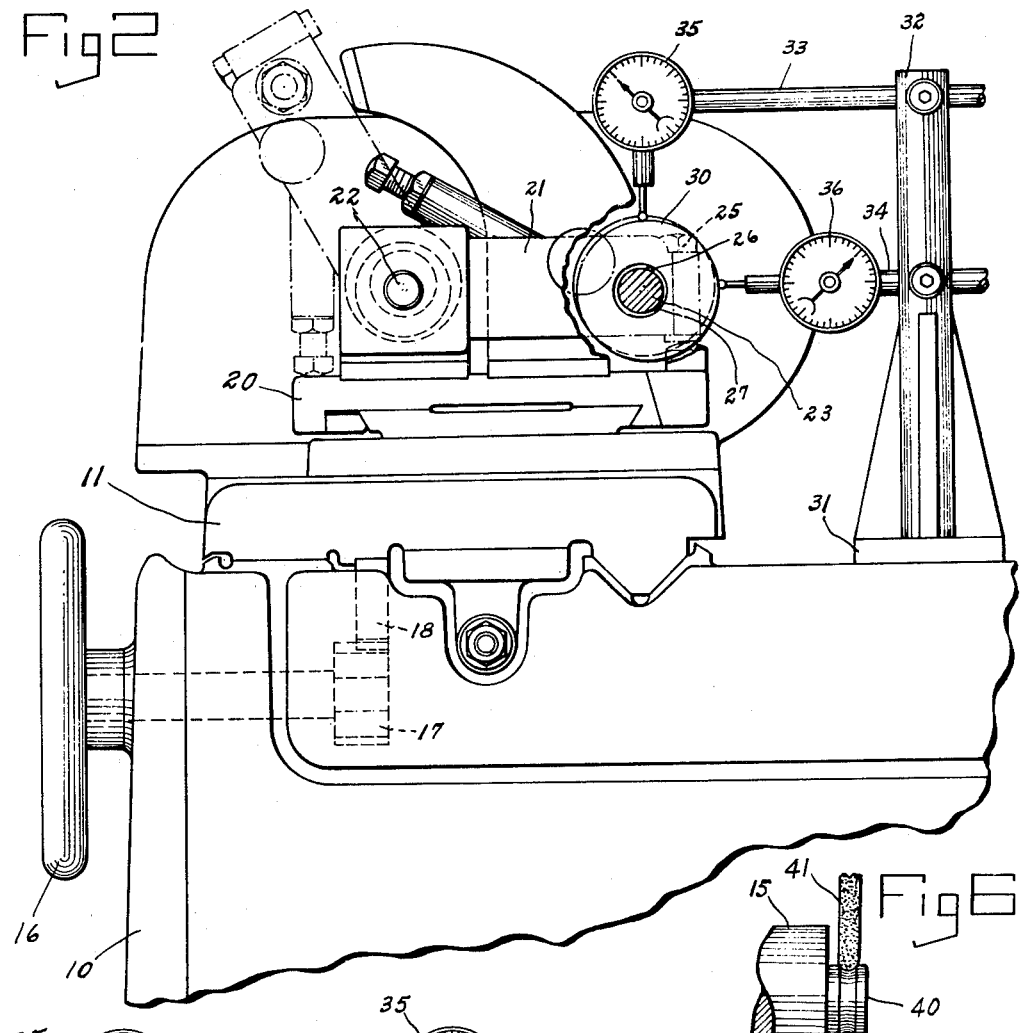
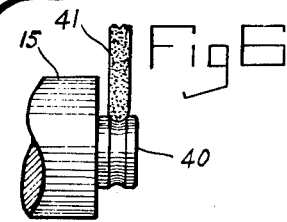
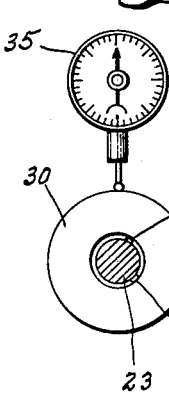
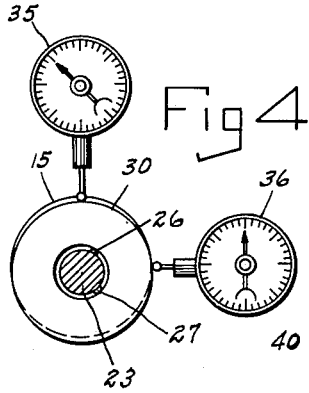
INVENTOR
HAROLD E. BALSIGER
BY
ATTORNEY

United States Patent Office 2,749,673
Patented June 12, 1956

2,749,673

GRINDING MACHINE SET-UP MEANS

Harold Edward Balsiger, Waynesboro, Pa., assignor to Landis Tool Company, Waynesboro, Pa.

Application February 19, 1953, Serial No. 337,760

4 Claims. (Cl. 51—103)

This invention relates to grinding machines for grinding work pieces wherein the work is rotated about a center offset both vertically and horizontally from the headstock spindle axis.

One of the difficulties encountered in setting up a machine of this type is to accurately locate the work supporting means so as to support a work piece in the desired off-set relation from the axis of the headstock spindle. It is therefore an object of this invention to provide a method and means for quickly and accurately locating the work support relative to the headstock spindle.

It is a further object of this invention to provide means whereby the work supporting member may be held both firmly and accurately in operative relation to the axis of the headstock spindle.

A further object is to provide a gaging ring having the same diameter as the work chuck and to support said ring on the work supporting arbor in the same manner as a work piece.

A further object is to provide indicator means to be applied to both said chuck and said gage ring.

A further object is to provide means for adjusting the work supporting arbor by mounting the gaging ring thereon and moving it vertically and horizontally until the indicators show the desired off-set in both directions.

In the drawings:

Figure 2 is an end elevation of the machine shown in Fig. 1.

Figure 3 is a partial and elevation showing a gage ring mounted on a work support in axial alignment with the chuck.

Figure 4 is similar to Fig. 3 except that the work support has been adjusted vertically relatively to the headstock spindle.

Figure 5 shows the work support with a work piece mounted thereon in off-set relation to the chuck. The last step in effecting this off-set relation through the gage ring is shown in Fig. 2 in which the work support 23 and gage ring 30 are adjusted both vertically and horizontally relative to the chuck as shown by the indicators.

Figure 6 is a partial plan view showing a work piece on a chuck in operative relation to a grinding wheel.

Figure 1:
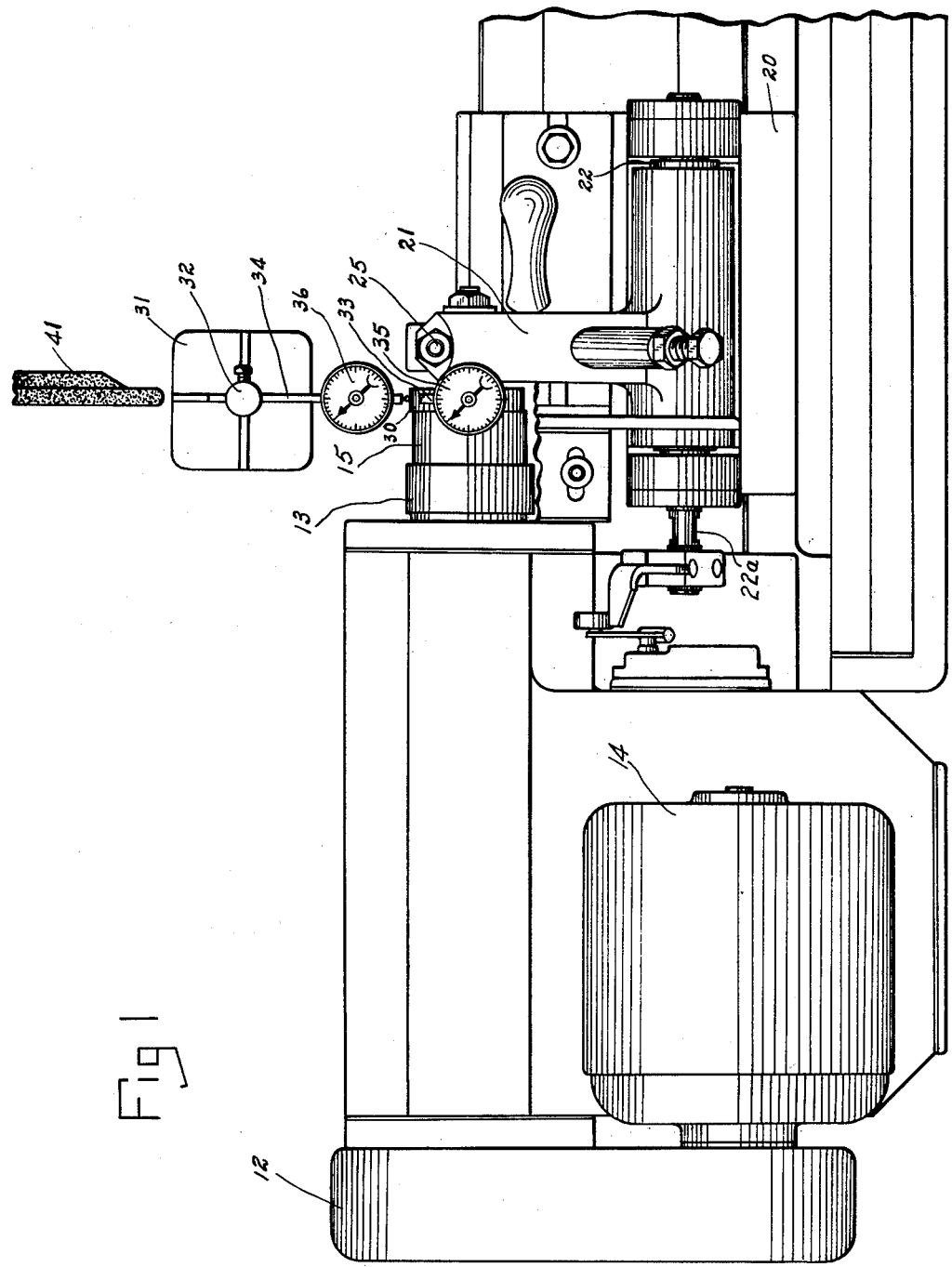
Figure 1 is a plan view of a machine showing the arrangement of my invention thereon.

Numeral 10 indicates the bed of a grinding machine having a carriage 11 slidably mounted thereon. The headstock 12 has a spindle 13 rotatably mounted therein. 14 is a motor for rotating said spindle and 15 is a permanent magnet chuck on said spindle. Hand wheel 16 is connected through gear 17 and rack 18 to move carriage 11.

The work supporting device is disclosed in co-pending application Serial No. 280,509 filed April 4, 1952, now Patent No. 2,694,883, granted November 23, 1954. This device consists of a base member 20 secured to carriage 11, a work support arm 21 mounted on adjustably eccentric shaft 22 on said base member, and a work supporting arbor 23 in the form of a stub-shaft at the opposite end of arm 21 from said eccentric shaft, said stub-shaft having peripherally spaced work engaging shoes 26 and 27 thereon. These are arranged preferably one above and one below the horizontal. An end portion 22a of eccentric shaft 22 has parallel flat surfaces to which a wrench may be applied to effect horizontal adjustment of arbor 23. An adjusting screw 25 on arm 21 provides a vertical adjustment for arbor 23. However, the invention is not limited to this specific arrangement. A bracket 31 on bed 10 has a vertical member 32. Arm 34 is adjustably mounted on member 32 and has an indicator 36 mounted thereon for indicating movement of ring 30 in a horizontal direction. This places the center of the work between the work spindle axis and the periphery of the grinding wheel. Arm 33, also adjustably mounted on member 32 has an indicator 35 positioned to indicate movement of ring 30 in a vertical direction. Ring 30 is the same diameter as the adjacent portion of the face plate so that a direct comparison may be made between the position of the periphery of the face plate and that of the gauge ring. By manipulation of the work support adjusting means, the work support arbor 23 may be positioned so that the indicator on gauge ring 30 shows the desired amount and direction of offset from the periphery of the adjacent face plate. This places the center of the work below the center of the work spindle.

*Operation*

Indicators 35 and 36 are placed in engagement with chuck 15 and each indicator is then set at zero. The work carriage 11 is then shifted to bring said indicators in contact with ring 30 on arbor 23. Said arbor is adjusted horizontally by application of a wrench to end portion 22a of eccentric shaft 22, and vertically by adjustment of screw 25 until both indicators show zero. From this position a further adjustment is effected by the same adjusting means both toward the wheel and downwardly until indicators 35 and 36 show the desired amount of off-set of arbor 23 from spindle 13 and chuck 15. This adjustment may be effected with the ring 30 either rotating or stationary. Then a work piece 40 is placed on arbor 23 and subjected to the action of grinding wheel 41 as shown in Fig. 6.

I claim:

1. In a grinding machine for grinding ringlike work pieces, a headstock having a spindle rotatably mounted therein, means on said spindle for driving a work piece, means for rotatably supporting a work piece in operative relation with said headstock comprising an arbor having an axis parallel with that of said headstock spindle and having peripherally spaced work engaging shoes thereon, means for adjusting the operative position of said arbor both vertically and horizontally, means for determining the extent of said adjustment relative to said headstock comprising means on said headstock having a peripheral surface of a given diameter concentric with the axis of said spindle, a ring removeably mounted on said arbor and having an outer diameter substantially identical with that of said peripheral surface, indicator means mounted to engage said peripheral surface in a vertical plane and in a horizontal plane through the axis thereof as a reference surface whereby to indicate the position of said arbor relative to said spindle.

2. In a grinding machine for grinding ringlike work pieces, a headstock having a spindle rotatably mounted therein, means on said spindle for driving a work piece, means for rotatably supporting a work piece in operative relation with said headstock comprising an arbor having an axis parallel with that of said headstock spindle and having peripherally spaced work engaging shoes thereon, one above and one below the horizontal plane through the axis thereof, means for adjusting the operative position of said arbor both vertically and horizontally, means for determining the extent of said adjustment relative to said headstock comprising means on said headstock having a peripheral surface of a given diameter, a ring removeably mounted on said arbor and having an outer diameter substantially identical with that of said peripheral surface whereby to serve as a reference surface, indicator means movably mounted in operative relation to said peripheral surface whereby to indicate the position of said arbor relative to said spindle.

3. In a grinding machine for grinding ringlike work pieces, a headstock having a spindle rotatably mounted therein, means on said spindle for driving a work piece, means for rotatably supporting a work piece in operative relation with said headstock comprising an arbor having an axis parallel with that of said headstock spindle and having peripherally spaced work engaging shoes thereon, means for adjusting the operative position of said arbor both vertically and horizontally, means for determining the extent of said adjustment relative to said headstock comprising means on said headstock having a peripheral surface of a given diameter, a gauge ring removeably mounted on said arbor and having an outer diameter substantially identical with that of said peripheral surface, means for supporting a pair of indicators in operative relation to said peripheral surface and said ring whereby to adjust said ring and hence said arbor to a predetermined position offset from said headstock spindle.

4. In a machine for grinding ringlike work pieces having means for rotatably supporting a work piece including an arbor, a work driving means including a face plate, said arbor having an axis parallel to but laterally off-set from said driving means, the method of adjusting the off-set between said work driving means and said arbor, which consists in mounting a gage on said arbor, said gauge being in the form of a ring of the same outside diameter as said face plate adjusting said gauge and arbor to a position co-axial with said work drive means by applying an indicator successively to the peripheries of said gauge and said face plate and then adjusting said gauge and said arbor vertically and horizontally relative to the axis of said driving means to provide the desired amount of off-set.

References Cited in the file of this patent

UNITED STATES PATENTS

| 517,466 | Levin | Apr. 3, 1894 |
| 1,006,550 | Heald | Oct. 24, 1911 |
| 1,236,748 | Osberg | Aug. 14, 1917 |
| 1,317,227 | Scusa | Sept. 30, 1919 |
| 1,427,510 | Avery | Aug. 29, 1922 |
| 1,834,179 | Place | Dec. 1, 1931 |
| 1,999,320 | Dunham | Apr. 30, 1935 |
| 2,034,507 | Colson | Mar. 17, 1936 |
| 2,141,065 | Haas | Dec. 20, 1938 |
| 2,528,295 | Balsiger | Oct. 31, 1950 |
| 2,569,873 | Stacey | Oct. 2, 1951 |
| 2,644,276 | Swanson | July 7, 1953 |
| 2,694,883 | Balsiger | Nov. 23, 1954 |